Feb. 10, 1970  R. L. BOGGS  3,494,814
METHOD OF FABRICATING PRELOADED LAMINATED BUSHING
Original Filed Sept. 26, 1966  3 Sheets-Sheet 1
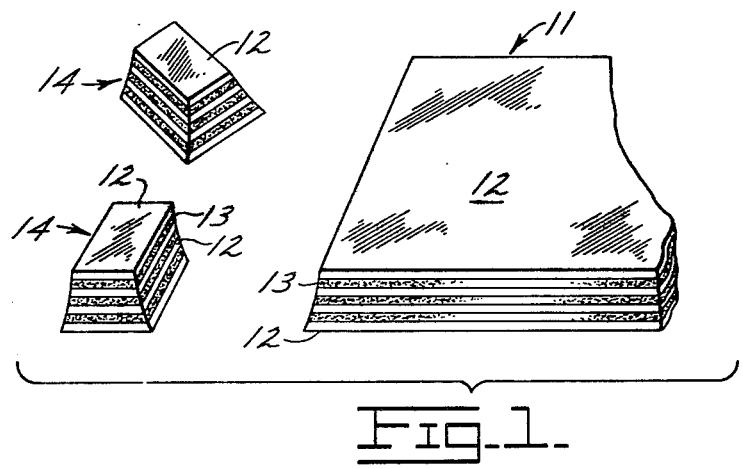
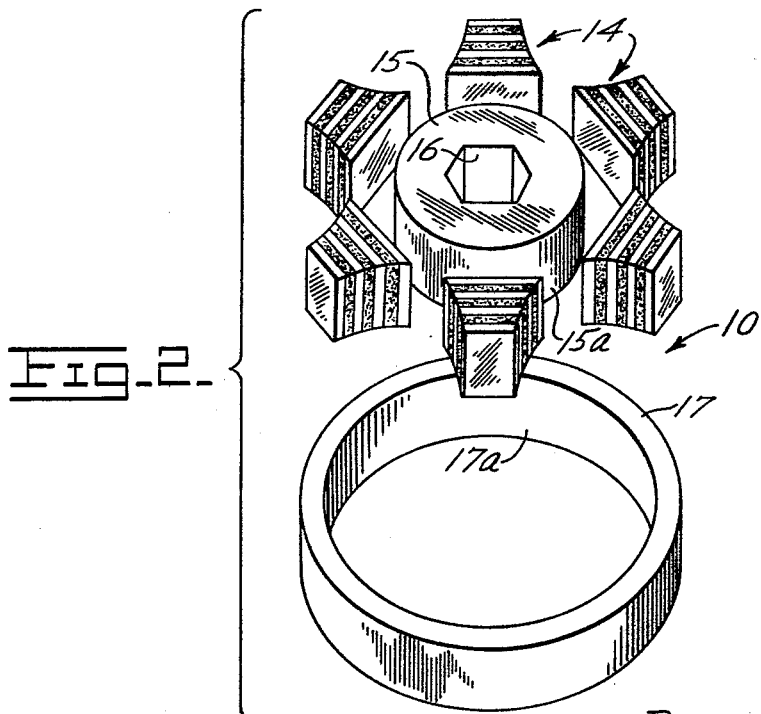
INVENTOR.
ROGER L. BOGGS
ATTORNEYS Feb. 10, 1970  R. L. BOGGS  3,494,814
METHOD OF FABRICATING PRELOADED LAMINATED BUSHING
Original Filed Sept. 26, 1966  3 Sheets-Sheet 2
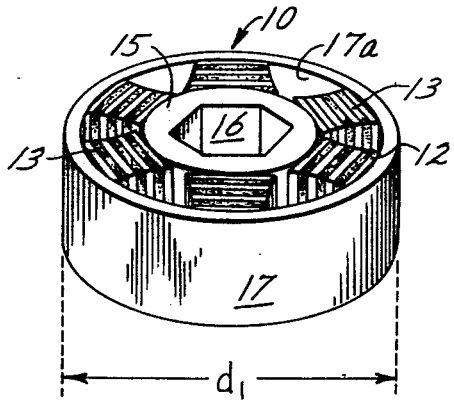
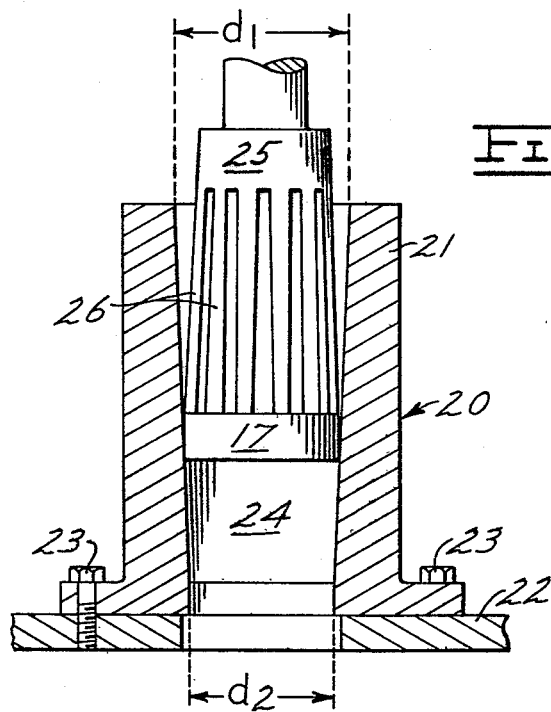
INVENTOR.
ROGER L. BOGGS
ATTORNEYS

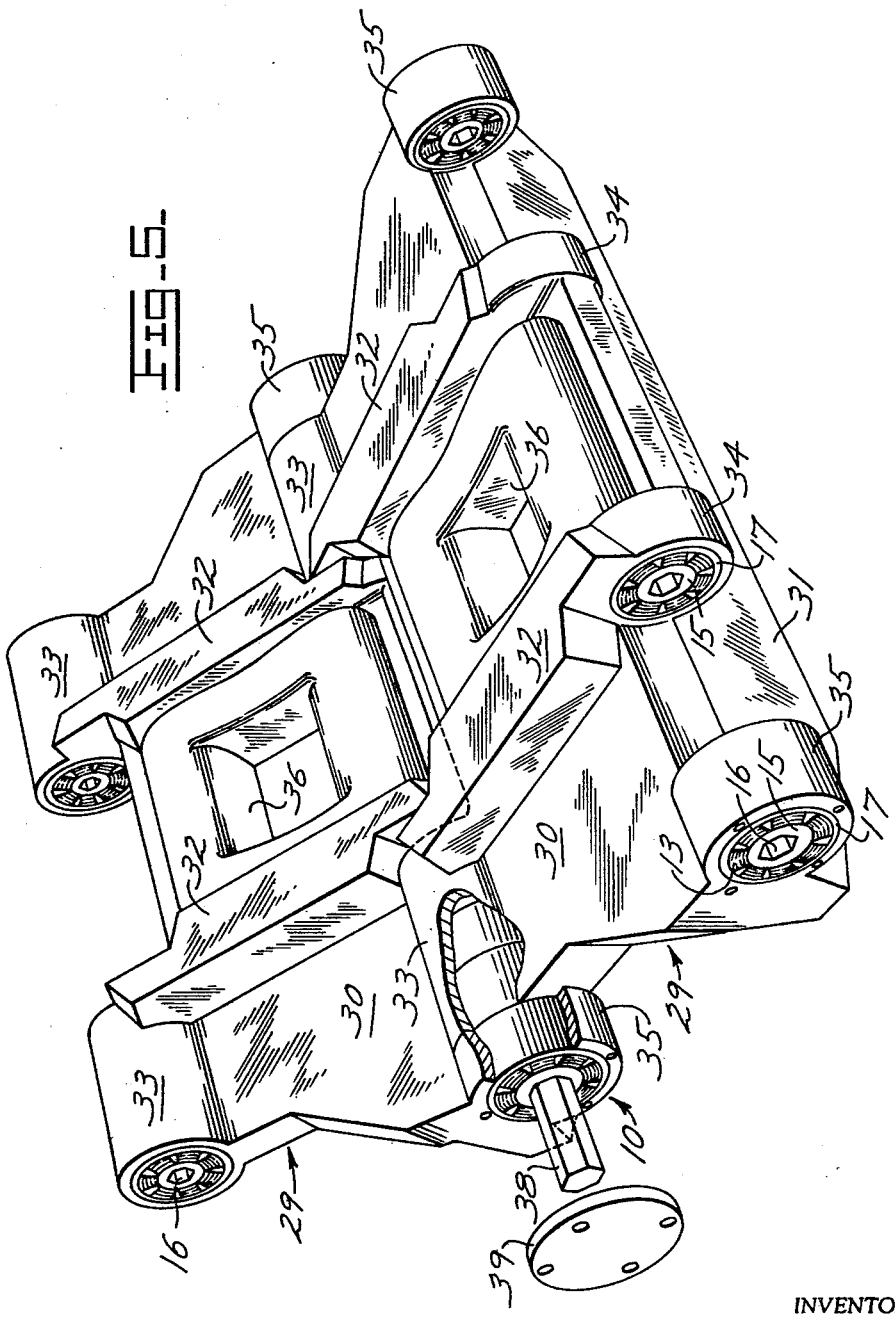

United States Patent Office 3,494,814
Patented Feb. 10, 1970

3,494,814
METHOD OF FABRICATING PRELOADED LAMINATED BUSHING
Roger L. Boggs, East Peoria, Ill., assignor to Caterpillar Tractor Co., Peoria, Ill., a corporation of California
Original application Sept. 26, 1966, Ser. No. 582,100. Divided and this application Feb. 2, 1968, Ser. No. 745,053
Int. Cl. B32b 31/04
U.S. Cl. 156—294                                    5 Claims

ABSTRACT OF THE DISCLOSURE

Circular bushings, having an outer ring and a concentric inner core with laminated bushing material of metal and elastomer sandwiched there between, are fabricated by a double swaging technique; one swaging step accomplished prior to the time the elastomer is cured and the other being accomplished after it is cured to preload the laminate.

---

This is a division of U.S. application Ser. No. 582,100, filed Sept. 26, 1966, now Patent 3,377,110, dated Apr. 9, 1968.

This invention relates to a method of making laminated bushings between an inner core element and an outer retaining sleeve.

An object of this invention is a method of making novel bushings for connecting oscillating elements, where the bushings have limited torsional deflection requirements during operation.

Another object is a method of making the provision of a laminated bushing which is highly resistant to radial deflection due to loads thereon and still is capable of accommodating torsional deflections across the bushings to a limited degree.

Still another object is the provision of a method of assembling tracks for track-type vehicles under a torsional load between adjacent track links which, when mounted on vehicles tend to prevent elongation of the endless track at higher speeds.

The above objects and others which will be apparent in the detailed description which follows can be accomplished by forming bushings with a cylindrical core element mounted coaxially inside a larger outer retaining sleeve element wth a pluralty of stacks composed of alternate thin layers of elastomeric material and metal sheets compressed between the cylindrical core element and the outer retaining sleeve, and using these types of bushings for connecting adjacent ends of oscillating elements, such as track elements with a pin.

The advantages of this invention will be apparent from the specific description which follows interpreted in light of the accompanying drawings wherein:

FIG. 1 is a perspective of laminar bearing material milled with a contour cutter for making bearing stacks for the novel bushings;

FIG. 2 is an exploded view showing how the bushing is assembled during its fabrication;

FIG. 3 is a perspective of the bushing assembled for the first swaging operation;

FIG. 4 is a section of a swaging device used to reduce the diameter of the retaining sleeve shown in FIG. 3 in order to compress the bearing material between the core element and the retaining sleeve; and FIG. 5 is a perspective of connected ends of a pair of track elements having parts broken away to show how the new bushings are assembled with the elements.

The bearing surfaces of the novel bushing 10 are formed from a laminated bearing material 11 shown in FIG. 1. This bearing material is fabricated of alternate layers of thin metal sheet material 12 and uncured elastomer 13 which are built up in a sandwich-like structure. The uncured elastomer is tacky and adhesively holds the sandwich together after it is formed.

The individual layers of both metal and elastomer are preferably very thin, usually less than 0.01 inch in thickness. Quite often the elastomer will be sprayed onto the metal sheet material 12 as a thin coating having a thickness of 0.005 inch when fabricating the sandwich. It is quite important that the layers of elastomer 13 be quite thin if the bearing material is to be resistant to radial compression in the final bushing and also to prevent the extrusion of the elastomer from between the layers of metal sheet material in service. The relationship and relative thicknesses of the layers of types of bearing material herein contemplated is more fully explored and discussed in U.S. Patent No. 2,900,182 issued to Hinks, and that disclosure is incorporated herein by reference to the extent it is applicable.

When the sandwich is formed layers of sheet material 12 are on the outside surfaces of the bearing material so it can be conveniently handled. This sandwich of laminant as shown in FIG. 1, is cut into the appropriate shapes for making the finished bushing. Some of the bushing material 11 shown in FIG. 1, is sectioned with a contour cutter into individual stacks or ribs 14 which are used for bushing fabrication.

Stacks or ribs 14 are assembled in a spoke-like fashion around a core element 15 which has irregular axial aperture 16 as shown in FIG. 2, so that the planes of the laminate are generally concentric with the outer surface 15a of the core element. Thereafter the core element and the plurality of radially extending stacks or ribs are inserted and centrally positioned in a retaining sleeve 17 to form an assembly, as shown in FIG. 3. Usually it is desirable to coat the outer surface 15a of the core element and the inner face 17a of the sleeve with a thin coating of elastomer prior to assembling the unit so that the stacks or ribs of the bearing material will be bonded to these parts in the finished bushing. Alternatively, the outer metal layers of the stacks and ribs can be sprayed with a thin coating of elastomer prior to their assembly between the core element and sleeve, as shown in FIG. 3. This technique also insures that the stacks will be secured at opposite ends to the sleeve and core, respectively.

Once the assembly shown in FIG. 3 is completed, during which time the ribs or stacks are partly conformed to the cylindrical surfaces of the core element and the sleeve so that they will be closely positioned between these parts, they are ready for the first swaging operation, which is the next step in the fabrication of the bushing.

The first swaging step is accomplished in a conventional swaging device, such as that shown in FIG. 4, which reduces the outside diameter of the retaining sleeve 17 from $d1$ to $d2$, thereby compressing the stacks or ribs 14 of bearing material between the sleeve and the core element since the latter is not compressible. In practice, the change of diameter $d1$ to $d2$ is selected to develop something above 25 p.s.i. of compressive load on the stacks or ribs positioned between the core and the sleeve, and more preferably, from 50 to 100 p.s.i. Since the bearing material was fabricated with uncured elastomer layers, the individual pieces of metal sheet material can shift slightly relative to one another as the diameter of the retaining sleeve is reduced, effecting a compression on the stacks or ribs. Further, as this radial load is applied on the stacks or ribs, the portions of the laminates which have an excess of elastomer between the sheet material are caused to extrude the excess elastomer from the edges of the stacks. This swaging operation tends to make the thicknesses of the layesr of elastomer within each stack fairly uniform, and also tends to make the thicknesses of the layers of elastomer in adjacent stacks equal as well. Obviously, this uniformity within the stacks of bearing material greatly enhances the service life of the finished bushing since it tends to distribute the load across all of the stacks during operation of the bushing.

A means to reduce the diameter of the retaining sleeve 17 from the oversized diameter $d1$ to the desired diameter of $d2$ is to place the oversized sleeve with the core element suspended therein on the ribs 14, as shown in FIG. 3, in a swaging die 20 (shown in FIG. 4). The die member 21 of the swaging die is secured to a suitable support 22 through bolts 23. This die member has a tapering bore 24 which is slightly larger at the top than the diameter $d1$ of the un-swaged sleeve element 17 and tapers to a smaller diameter, $d2$ or slightly less, at the bottom of the die. As the ductile sleeve element is forced through the bore of this die member, it will be reduced from a diameter of $d1$ to $d2$. The sleeve is forced through the die by a conventional plunger 25 having resilient fingers 26. This will cause the bearing material 11 between the sleeve element and the core element to be radially compressed and will result in a compressive load on the individual stacks.

The open area provided between the adjacent ribs prevents the metal laminates of the bearing material from buckling as they are compressed which, if occurring, will reduce the service life of the bushing.

Of coursefi when the retaining sleeve 17 is swaged down to a diameter $d2$, the layers of elastomer between the adjacent metal layers in all of the stacks are placed under stress as each of the stacks are compressed against the core element 15. To relieve the stress and to obtain bonding between the metal layers in each stack through the elastomer layers and bonding to the sleeve and the core the assembly is heated to cure the elastomer. Since the swaging has placed the elastomer under stress and increased its density, heating the assembly will cure the elastomer, produce strong bonds between adjacent layers of metal sheets, and also between the stacks and the retaining sleeve and core at opposite ends, respectively.

Subsequent to the curing of the elastomer in the assembled bushing, the bushing is then ready for a second swaging operation which is carried out identical to the first swaging operation described above, wherein the retaining sleeve is reduced from $d2$ to $d3$ to place a pre-load on the elastomer. In general, the amount of pre-load on the ribs or stacks 14 is somewhat of an art, and therefore it is difficult to fix real limits which are meaningful. However, the amount of pre-load can be described empirically by discussing the individual elastomer layers. Actually, the retaining sleeve is reduced sufficiently to compress the layers of elastomer sufficiently so that the substantial portion of the elastomer layer does not go into tension within the torsional operating limits of the bushing. Actually, this is more understandable by recognizing that the bushing in effect is a spring bushing wherein the core is torsionally displaced relative to the retaining sleeve during the operation of the bushing. When this occurs, the individual stacks of laminates absorb the relative movement by laminar shifts within the stacks or ribs. These laminar shifts are effected by sliding movements of the layers of the sheet material in the stacks relative to one another. Thus, the empirical formula requires that the elastomer layer be compressed sufficiently so that the substantial portion of each elastomer layers will not go into tension within the operational torsional limits of the bushing. Put another way, the layers of elastomer are compressed sufficiently so that when the laminar shifts occur they will not have a height greater than that before they were compressed by the second swaging operation. When a bushing is fabricated under these conditions, the service life of the bushing will be manifestly increased since the substantial portion of each elastomer layer does not go into tension when the bushing is in operation, and tension is the condition which will cause the elastomer to break down and pull free of the sheet metal material.

Further investigations are being conducted on the degree of pre-load which is desirable in these types of bushings. However, it is known that the conditions which prevent the elastomer layers from going into tension, as mentioned above should be met.

In some applications it may well be that the load on the individual ribs developed by the pre-load and the radial load on the bushing may be in the neighborhood of 8,000 p.s.i., while in other cases it very possibly may exceed 30,000 p.s.i. Thus, it can be appreciated that the amount of pre-load effected by the second swaging operation may vary in proportional to the radial load placed upon the bushings during their service.

The pre-load obtained by the second swaging operation in fabricating the bushing provides an increase in the density of the cured elastomer layers, and increases the bushings' resistance to radial deflection when radial loads are applied on the bushings under actual service conditions.

In some cases for better performance of the bushing it may be desirable to contour stacks or ribs 14 slightly so that the surface areas of the layers of metal sheet material of each stack closer to the sleeve are less than the surface area of the layer of sheet material adajcent to the core. Actually, this change in area should progressively diminish as one moves from the core to the sleeve. In the drawing, this condition is shown wherein the stacks or ribs are cut with a contour cutter to effect this area relationship. In any case, the outer surface areas of the layers adjacent to the sleeve should not be greater than those adjacent to the core.

Once the bushings 10 have been fabricated as described above, they can be used in hinging joints connecting adjacent track elements together into an endless track. Two high speed track elements 29 are shown connected using the new bushings in FIG. 5. These track elements are composite units having a body 30, a grouser 31, track areas 32, spaced apart bushing housings 33 along one edge and mating interlocking bushing housings 34 and 35 along the opposite edge. Outer housings 35 are spaced sufficiently on either side of the central housings 34 so that the spread bushing housings 33 on another track element can be inserted between outer housing and the central housing to form a hinging joint, as can be seen in FIG. 5. An aperture 36 located in the central portion of each track element between the track areas receives the teeth of the driving sprockets when the elements are assembled into an endless track on a vehicle.

In FIG. 5, part of the bearing housings 33 and 35 are broken away to show how the bushings are positioned in the hinging joint between the adjacent track elements 29. Generally the completed bushings are press-fitted into the bearing housings so the retaining sleeve 17 of each bushing will move with the bearing housing. Alternatively the bushing sleeve elements can be locked in the bearing housing utilizing slots and/or keys. The core elements 15 of the bushings are equipped with hexagonal apertures 16 so that a fitted track pin 38, hexagonal in cross section, can be inserted through the apertures of adjacent bushings to lock all the core elements of all the bushings in the hinge housings on each side together as a unit. Thus, with the track pins inserted, rotation of the core elements relative to one another is prevented. The track pins are retained in the bushings by a pin retaining plate 39 which fastens to the elements 29.

When the two track elements 29 are assembled, as shown in FIG. 5, by inserting track pins 38 through the apertures 16 of the bushings in the bearing housings 33. 34 and 35 to form a hinge joint, the hinging movement of the joint is accomplished through laminar deflection of the bearing material between the core elements 15 and retaining sleeves 17 since the core elements are locked together and the retaining sleeve elements are prevented from rotating within the bearing housings 33, 34 and 35. In this manner, a hinge joint for track elements is formed wherein the actual bearing is a plurality of thin layers of metal separated by elastomeric layers which are capable of deflecting along the plane of their laminations. Since there is no metal to metal contact, little heat is generated in this bushing and no lubrication is required. The elastomeric layers between the metal layers also tend to seal out abrasive foreign matter. The resistance of the bushings to radial deflection under load because of their preload on the stacks of bushing material makes them suitable for use in these assemblies.

The laminar deflection in the layers of the bearing material is preferably reduced to a minimum by inserting track pins 38 in apertures 16 to join adjacent track elements 29 while they are in the middle of the hinging swing (as shown in FIG. 5) that they will undergo when connected in an endless track on a vehicle. So joined, the deflection across the bearing material in each bushing will be in opposite directions when the hinge swing moves to a maximum or minimum relative to the "pinned" position This is the preferred assembly of track elements with the assembly it reduces the degree of torsional deflections in all of the bushings and improves their service life. Also it tends to load the endless track in a manner which will tend to reduce elongation at higher speeds.

In the above specification reference has been made to metal sheet material and elastomeric material in connection with the bearing material of the novel bushing. It should be understood that "metal sheet material" is used to encompass a large group of metals which are resistant to compression and tensile deformation and that "elastomeric" is used to refer to both rubber based products and equivalent resilient products.

In the above description, it has been indicated that the pre-load after curing and accomplished by the second swaging should be such that a "substantial portion" of the elastomer layers do not go into tension within the designed torsion deflection limits of the complete bushing. Obviously near the edges of the stacks or ribs some of the elastomer may be slightly extruded and the compression on stacks non-uniform, thus allowing portions of the elastomer layers in these areas to go into tension even with small torsional deflections—thus the terminology "substantial portion."

I claim:
1. A method of making laminated bushings which are resistant to radial deflection comprising the steps of:
   (a) positioning a plurality of stacks of laminated bearing material between an inner core element and an outer retaining sleeve to support said core element concentrically within said sleeve, said laminated bearing material composed of alternate layers of metal sheet material and uncured elastomer material;
   (b) reducing the diameter of said retaining sleeve to compress said stacks between said sleeve and said core element to form an intermediate assembly;
   (c) heating said intermediate assembly to cure layers of uncured elastomer material in said stacks of bearing material and bond said stacks together; and
   (d) subsequently reducing the diameter of said retaining sleeve of said intermediate assembly after heatin to apply a compressive pre-load on the layers of cured elastomer material to form the completed bushing.

2. The method of making a laminated bushing as defined in claim 1 wherein the diameter of the retaining sleeve is reduced by swaging.

3. The method of making a laminated bushing as defined in claim 2 wherein the thickness of the alternate layers of metal sheet material and elastomer material in the bearing material is less than 0.01 inch.

4. The method of making a laminated bushing as defined in claim 3 wherein the diameter of the retaining sleeve is reduced sufficiently to place the stacks of bearing material under a compressive load of at least 25 p.s.i. prior to heating the intermediate assembly to cure the elastomer material.

5. The method of making laminated bushings as defined in claim 4 wherein the reduction of diameter of the retaining sleeve of the intermediate assembly after the heating step to apply a compressive pre-load on the layers of cured elastomer material is sufficient so that a substantial portion of said layers of cured elastomer material will not go into tension within the torsional deflection design limits of the bushing when in service.

References Cited

UNITED STATES PATENTS 2,900,182  8/1959  Hinks _____ 267—57.1
3,068,552  12/1962  Williams et al.

REUBEN EPSTEIN, Primary Examiner.

U.S. Cl. X.R.

29—149.5